Patented Apr. 29, 1941

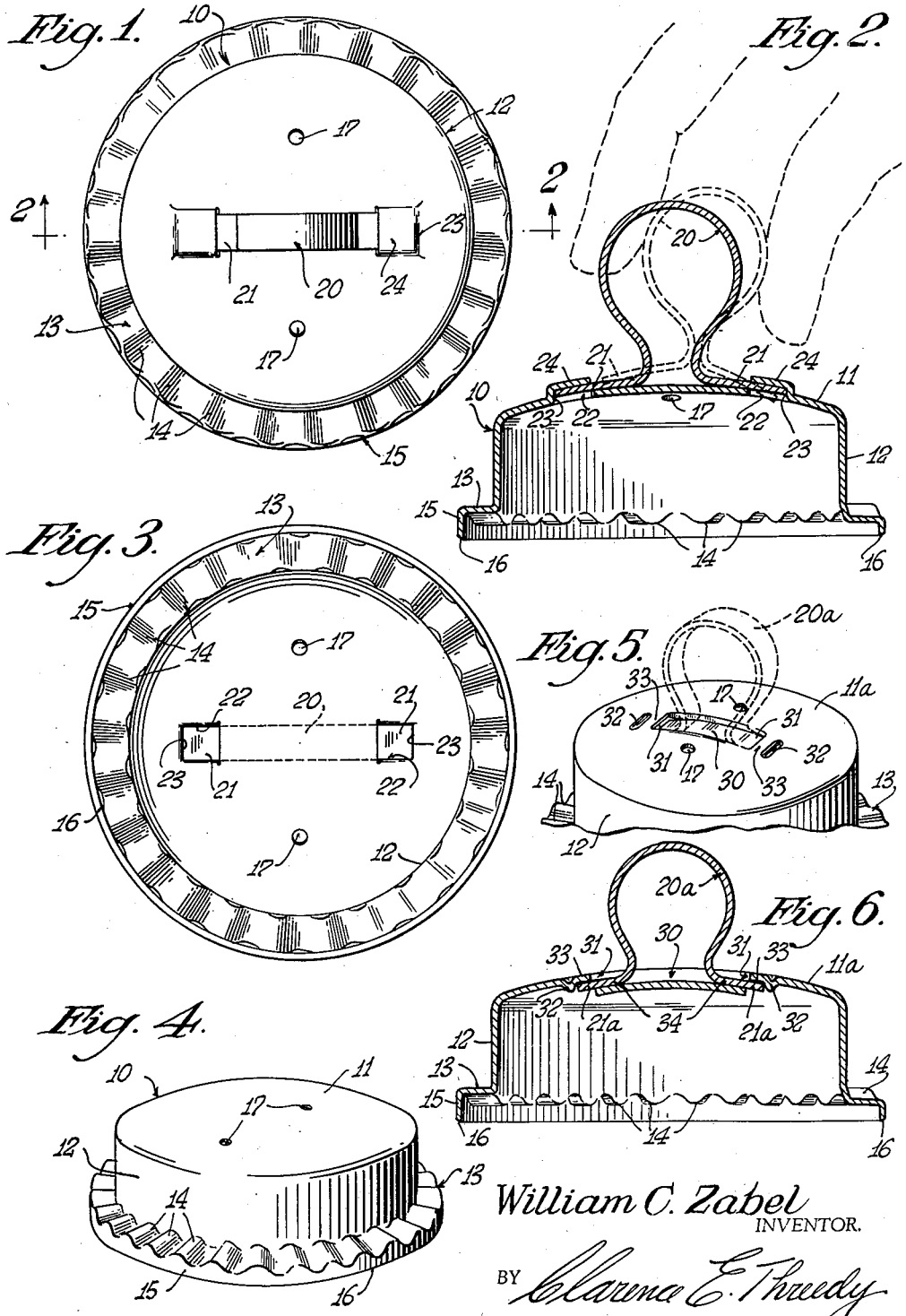

2,239,766

UNITED STATES PATENT OFFICE 2,239,766

CULINARY TOOL

William C. Zabel, Chicago, Ill.

Application April 19, 1940, Serial No. 330,449

1 Claim. (Cl. 107—49)

This invention relates to culinary tools and has as its principal object the provision of a cutter or mold especially suited for the subdivision of doughs in the making of raviola and analogous alimentary pastes, the device being useful also as a cooky cutter or the like.

One of the specific objects of the invention is the provision of such a mold by stamping the same from a unitary piece of metal to form a cup-shaped member with an undulated or serrated flange from which projects an annular cutting rim.

A further object is the provision of a novel removable handle for the mold, the operation and manufacture of which is extremely simple and expeditious.

Another object is the provision of a mold of the class described which is drawn and stamped from a single sheet of metal in such manner that a sharp cutting edge is provided on the mold as a result of a drawing of portions of the metal in the stamping operation.

Other objects, advantages and novel aspects of the invention reside in certain details of construction as well as the cooperative relationship of the component parts of the illustrative embodiment described hereinafter in view of the annexed drawing, in which:

Fig. 1 is a top plan view of the cutter and handle;

Fig. 2 is a vertical section along line 2—2 of Fig. 1;

Fig. 3 is a bottom plan view of the cutter and handle;

Fig. 4 is a perspective of the cutter alone;

Fig. 5 is a fragmentary perspective of a modified form of handle seating means;

Fig. 6 is a vertical section through the modified handle seating means of Fig. 5.

Referring to Fig. 4, the improved mold or cutter includes a generally cylindrical or cup-shaped member generally indicated at 10 and provided with a top portion 11 surrounded by a cylindrical vertical wall 12 which terminates in an outwardly projecting flange or rim 13 provided with a series of molding formations or undulations 14, and terminating in a downwardly turned skirt or cutting rim 15 sharpened as at 16 (Fig. 2) to facilitate the severance or cutting of the dough or other material responsive to a pressing of the cutter into the same.

The mold or cutter is a unitary member which may be struck from a single piece of metal stock in a suitable die stamping machine or which, if desired, may be molded from metal or plastic materials, the die stamping being preferred for purposes of economy, and the structural features and contours of the tool being peculiarly suited for manufacture by the die stamping.

The tool or cutter may be used alone, as shown in Fig. 4, by simply grasping the top and cylindrical portions 11 and 12 between the fingers, preferably with the top portion 11 fitted into the palm of the hand. It may be observed that one or more vents 17 are provided in the top portion so that when the cutting edge 16 of the rim works into the dough or paste, the entrapped or compressed air may escape to permit pressing the mold into and through the dough to sever the same by action of the edge 16 and to press the molding or undulated formations 14 fully into the same to provide the requisite deckling for decorative purposes.

Another important feature of the invention resides in the provision of a removable handle in the preferred form of a band of spring metal bent over in substantially circular contour to provide a bight portion 20 provided with oppositely divergent leg portions 21 each of which is adapted to spring into a slot 22 stamped in the top portion 11 of the mold with a generally vertical stopping surface 23 against which the end of the corresponding leg is urged by the spring action of the bight, each slot including an upwardly offset strap portion 24 which overlies the upper portion of the corresponding leg adjoining the edge portion thereof to seat the handle firmly on the top of the cutter as illustrated in Fig. 1, for example.

In order to remove the handle from its applied condition shown in Fig. 2, the opposite sides of the bight 20 are grasped and squeezed between the fingers into the compressed condition illustrated in dotted lines, with the result that the opposite legs or feet 21 are retracted from their respective slots 22 for separation from the cutter, the reverse operation, of course, being effected in applying the handle.

An important feature of the invention resides in the method of producing a cutter having a cutting edge 16 which is sharpened or rendered sharp as a result of the stamping or drawing of the shell. The mold is stamped from a sheet of metal of suitable gauge, and the formation of the cylindrical wall portions 12 result in a drawing or thinning out of the metal in this region as well as in the cutting rim 15, and the dies are so formed that the cutting edge 16 is drawn so thin as to be substantially sharpened, so that it is unnecessary to sharpen the edge of the skirt as a separate step in the manufacture of the device.

The modified structure of Figs. 5 and 6 differs from the previously described structure in respect to the seating means for the detachable handle. On the top portion 11a of the mold of Fig. 5 there is stamped a diametrically extending recess 30, the width of which corresponds to the width of the handle element 20a, and at the opposite ends of this recess, openings or slots 31, extending in a direction across the recess 30, are cut through the metal of the top portion 11a to receive the opposite end portions or feet 21a (Fig. 6) of the handle when the latter is sprung into place.

Means for additionally securing the handle in position in the modified device of Figs. 5 and 6 includes the provision of inwardly projecting bosses 32 stamped in the top wall 11a in outwardly spaced relation from the slots 31 to abut the ends of the feet in a manner analogous to the abutment thereof with the stopping surface 23 in the device of Fig. 2. It will be observed that each foot portion of the handle near the ends thereof is overlaid by a cross portion 33 of the top wall analogous to the strap portions 24 of Fig. 2.

An additional advantage of the arrangement of Fig. 5 resides in the added rigidity and support given the handle by seating of the portions in the region 34 thereof snugly in the recess 30.

The various advantages and objects of the invention may be accomplished by modifications of the particular method and embodiment specifically described herein, and it is intended that the appended claim shall include all equivalent arrangements and methods fairly coming within their call.

Having thus described my invention, what I claim as new and desire to protect by Letters Patent is:

A cutter of the class described in the form of a unitary body of substantially cup-shape including a top wall having means providing attachment for a handle and having an integral depending cylindrical wall portion terminating in an outwardly projecting flange portion extending circumferentially of said cylindrical wall portion and having a series of unbroken undulations providing mold formations, said flange portion being provided with an annular cutting rim extending circumferentially and coaxially of said flange and cylindrical wall portion, and a handle for said body.

WILLIAM C. ZABEL.